United States Patent
Mickelson (10) Patent No.: US 10,711,926 B2
(45) Date of Patent: Jul. 14, 2020

(54) SEALING ASSEMBLY WITH RETENTION SLEEVE FOR FLUID CONDUIT CONNECTOR

(71) Applicant: CNH Industrial America, LLC, New Holland, PA (US)

(72) Inventor: Roger D. Mickelson, Mesa, AZ (US)

(73) Assignee: CNN Industrial America LLC, New Holland, PA (US)

( * ) Notice: Subject to any disclaimer, the term of this patent is extended or adjusted under 35 U.S.C. 154(b) by 165 days.

(21) Appl. No.: 15/796,931

(22) Filed: Oct. 30, 2017

(65) Prior Publication Data

US 2019/0128451 A1   May 2, 2019

(51) Int. Cl.
  *F16L 19/02*   (2006.01)
(52) U.S. Cl.
  CPC .................. *F16L 19/0218* (2013.01)
(58) Field of Classification Search
  CPC ................. F16L 19/0212; F16L 19/0218
  USPC ......................................................... 285/354
  See application file for complete search history.

(56) References Cited

U.S. PATENT DOCUMENTS

| | | | | |
|---|---|---|---|---|
| 672,598 A | * | 4/1901 | Drew | F16L 41/086 |
| | | | | 277/616 |
| 1,875,330 A | * | 9/1932 | Eisenman | F16L 19/0218 |
| | | | | 285/119 |
| 2,208,353 A | * | 7/1940 | Woolley | F16L 17/067 |
| | | | | 285/108 |
| 2,318,112 A | * | 5/1943 | Stillwagon | F16L 19/0218 |
| | | | | 285/110 |
| 2,652,268 A | * | 9/1953 | Goode | F16L 19/0212 |
| | | | | 285/110 |
| 3,167,322 A | | 1/1965 | Aichroth | |
| 3,249,372 A | * | 5/1966 | Pollack | F16L 19/0212 |
| | | | | 277/622 |
| 3,425,716 A | * | 2/1969 | Blau | F16L 23/036 |
| | | | | 277/608 |
| 3,442,515 A | | 5/1969 | Murauskas | |

(Continued)

OTHER PUBLICATIONS

Parker Hamnifin Corporation, Cleveland, Ohio "Parker O-Ring Handbook, 50$^{th}$ Anniversary Edition" Dated 2007 (292 pages).

(Continued)

*Primary Examiner* — David Bochna
(74) *Attorney, Agent, or Firm* — Peter Zacharias; Patrick Sheldrake (57) ABSTRACT

In one aspect, a sealing assembly may include a connector body extending axially between an outer surface and an inner surface. The connector body may define a groove extending axially from the outer surface toward the inner surface. The groove may include a first groove portion and a second groove portion. The first groove portion may be at least partially defined by a first bottom surface of the connector body and may include a first depth. The second groove portion may be at least partially defined by a second bottom surface of the connector body and may include a second depth that may be greater than the first depth. The sealing assembly may also include a gasket positioned in the first groove portion. Furthermore, the sealing assembly may include a retention sleeve positioned in the second groove portion and configured to retain the gasket within the first groove portion.

19 Claims, 4 Drawing Sheets

(56) References Cited

U.S. PATENT DOCUMENTS

| | | | | |
|---|---|---|---|---|
| 3,701,549 A * | 10/1972 | Koomey | F16L 17/067 |
| | | | 285/113 |
| 4,572,551 A * | 2/1986 | Jaquette | F16L 19/0212 |
| | | | 285/108 |
| 4,586,735 A * | 5/1986 | Innes | F16L 19/0212 |
| | | | 285/354 |
| 5,762,341 A * | 6/1998 | Wright | F16J 15/062 |
| | | | 277/300 |
| 7,063,329 B2 * | 6/2006 | Anderson | F16J 15/062 |
| | | | 277/626 |
| 7,306,237 B2 * | 12/2007 | Tsuji | F16J 15/062 |
| | | | 277/644 |
| 7,793,994 B2 * | 9/2010 | Boyd | F16L 19/005 |
| | | | 285/330 |
| 9,638,363 B2 * | 5/2017 | Kury | F16L 19/0218 |
| 2004/0021319 A1 * | 2/2004 | Richardson | F16L 19/0218 |
| | | | 285/354 |
| 2004/0089455 A1 * | 5/2004 | Richardson | F16L 19/0212 |
| | | | 166/386 |
| 2008/0191474 A1 * | 8/2008 | Kotz | F16J 15/062 |
| | | | 285/276 |
| 2014/0110937 A1 * | 4/2014 | Okabe | F16L 19/0218 |
| | | | 285/354 |
| 2017/0051852 A1 * | 2/2017 | Kocourek | F16L 19/0218 |
| 2019/0162337 A1 * | 5/2019 | Ishibashi | F16L 19/0218 |

OTHER PUBLICATIONS

Eriks "Sealing Elements—Technical Documentation O-rings" Dated: 2017 (6 pages).

* cited by examiner

SEALING ASSEMBLY WITH RETENTION SLEEVE FOR FLUID CONDUIT CONNECTOR

FIELD

The present disclosure generally relates to fluid conduit connectors and, more particularly, to sealing assemblies having retention sleeves for retaining gaskets within grooves for use in fluid conduit connectors.

BACKGROUND

Fluid-driven systems, such as hydraulic systems, generally include various fluid conduits for circulating fluid throughout the system. For example, pipes or hoses may convey fluid between a reservoir and a fluid-driven actuator, such as a hydraulic cylinder. As such, the pipes or hoses may be connected to the reservoir and/or the actuator by fluid conduit connectors. Furthermore, the pipes or hoses may also be connected to each other via fluid conduit connectors.

Many fluid conduit connectors include a gasket, such as O-ring seal, to prevent fluid from leaking out of the connector. Specifically, the gasket may be at least partially positioned in a groove formed into one portion of the connector. In many instances, the groove includes a dovetail portion on its outer diameter. As such, the groove partially receives the gasket.

Machining the dovetail portion is difficult. More specifically, a cutting tool used to form the dovetail must include a wing at one end thereof. During machining, the cutting tool is pushed into the connector while the connector is spinning in a lathe chuck. After the cutting tool reaches the desired depth of the groove, the cutting tool is moved radially to form the dovetail portion. The cutting tool is then moved back radially to its initial position and removed from the connector. Such radial movement requires that the cutting tool be wider than the desired width of the groove (i.e., wider than the gasket). However, when the groove is larger than the gasket, the gasket may become dislodged from the groove or misaligned relative to a mating sealing surface of an adjacent component of the connector, thereby causing the connector to leak.

Accordingly, an improved sealing assembly with a retention sleeve for retaining a gasket within a groove would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a sealing assembly. The sealing assembly may include a connector body extending axially between an outer surface and an inner surface. The connector body may define a groove extending axially from the outer surface toward the inner surface. The groove may include a first groove portion and a second groove portion. The first groove portion may be at least partially defined by a first bottom surface of the connector body. The first groove portion may include a first depth extending axially from the outer surface of the connector body to the first bottom surface of the connector body. The second groove portion may be at least partially defined by a second bottom surface of the connector body. The second groove portion may include a second depth extending axially from the outer surface of the connector body to the second bottom surface of the connector body. The second depth may be greater than the first depth. The sealing assembly may also include a gasket positioned in the first groove portion. Furthermore, the sealing assembly may include a retention sleeve positioned in the second groove portion. The retention sleeve may be configured to retain the gasket within the first groove portion.

In another aspect, the present subject matter is directed to a fluid connector for coupling a first fluid component to a second fluid flow component to provide a continuous fluid passageway between the first and second fluid conduits. The fluid connector may include a fitting coupled to one of the first fluid component or the second fluid component. The fluid connector may also include a sealing assembly coupled to the other of the first fluid component or the second fluid component. The sealing assembly may be configured to seal against the fitting to seal the fluid passageway. The sealing assembly may include a connector body extending axially between an outer surface and an inner surface. The connector body may define a groove extending axially from the outer surface toward the inner surface. The groove may include a first groove portion and a second groove portion. The first groove portion may be at least partially defined by a first bottom surface of the connector body. The first groove portion may include a first depth extending axially from the outer surface of the connector body to the first bottom surface of the connector body. The second groove portion may be at least partially defined by a second bottom surface of the connector body. The second groove portion may include a second depth extending axially from the outer surface of the connector body to the second bottom surface of the connector body. The second depth may be greater than the first depth. The sealing assembly may also include a gasket positioned in the first groove portion. Furthermore, the sealing assembly may include a circular retention sleeve positioned in the second groove portion. The circular retention sleeve may be configured to retain the gasket within the first groove portion.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a sealing assembly for use in a fluid conduit connector. The disclosed sealing assembly may include one or more components that retain a gasket, such as an O-ring seal, within a groove of the sealing assembly. For example, in several embodiments, the sealing assembly may include a connector body, which may form part of the fluid conduit connection. As such, the connector body may define a groove configured for receiving the gasket. Specifically, in several embodiments, the groove may be wider than the gasket that it receives. As will be described below, the groove may include a first groove portion and a second groove portion that is deeper than the first groove section. In this respect, the gasket may be positioned within the first groove portion. The sealing assembly may further include a retention sleeve positioned within the second groove portion. As such, the retention sleeve may be configured to retain the gasket within the groove (i.e., the first groove portion). For example, in some embodiments, the retention sleeve may be configured to compress the gasket between the retention sleeve and a first groove portion side surface of the connector body that at least partially defines the first groove portion. Furthermore, in one embodiment, the retention sleeve may be configured to retain a portion of the gasket within a dovetail of the groove. As such, the retention sleeve may prevent the gasket from becoming dislodged from the groove or misaligned with a mating component of the fluid conduit connector.

Figure 1:
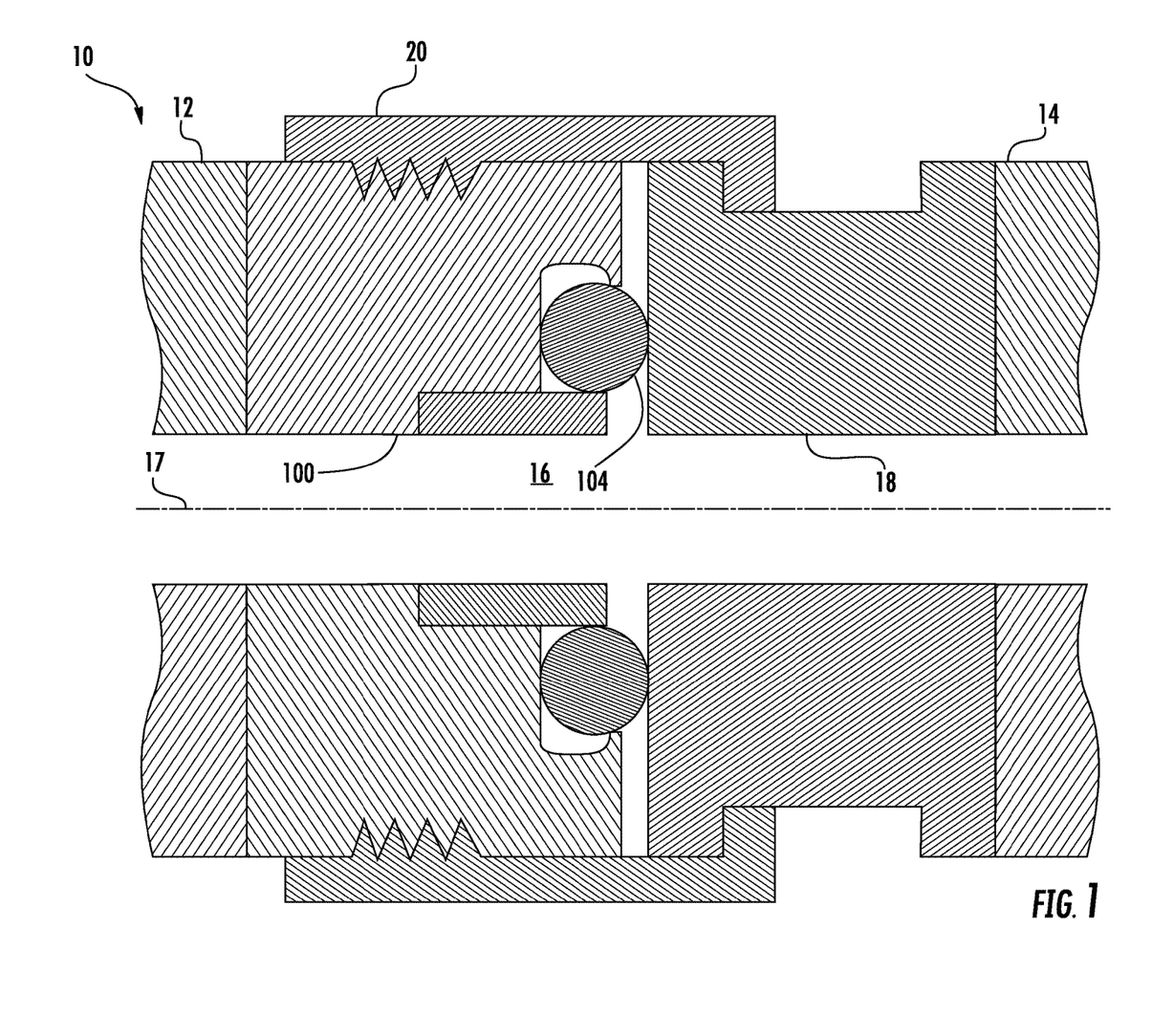
FIG. 1 illustrates a cross-sectional view of one embodiment of a fluid conduit connector in accordance with aspects of the present subject matter.

Referring now to FIG. 1, a cross-sectional view of one embodiment of a fluid conduit connector 10 is illustrated in accordance with aspects of the present subject matter. In general, the connector 10 may be configured to couple one or more fluid conduits, such as a first conduit 12 and second conduit 14, to define a continuous fluid passage 16 therethrough. As illustrated in FIG. 1, in several embodiments, the first and second conduits 12, 14 may be suitable hoses, pipes, and/or the like. Although the connector 10 is illustrated in FIG. 1 as coupling two fluid conduits 12, 14 to each other, the connector 10 may couple any suitable number of fluid conduits, such as more than two fluid conduits. Furthermore, it should be appreciated that the one or more of the conduits 12, 14 may also be fluid reservoirs, fluid actuators, or any other suitable fluid flow components configured to be fluidly coupled to another fluid flow component. As used herein, the term "fluid flow component" generally refers to any component from which a fluid is removed, through which a fluid is directed, and/or to which a fluid is supplied, such as conduits, actuators, fluid reservoirs, and/or the like. Additionally, as shown in FIG. 1, the fluid conduit connector 10 may define an axial centerline 17.

As schematically shown in FIG. 1, the connector 10 may include a sealing assembly 100 that is configured to prevent fluid from leaking out of the fluid passage 16. For example, in one embodiment, the sealing assembly 100 may be coupled to the first conduit 12. As such, the sealing assembly 100 may be configured to seal against a fitting 18 that is coupled to the second conduit 14. Additionally, the connector 10 may include a fastener 20, such as a nut, which may couple to the sealing assembly 100 and the fitting 18 so as to retain the sealing assembly 100 and the fitting 18 in sealing engagement. However, it should be appreciated that, in alternate embodiments, the sealing assembly 100 may be coupled to the second conduit 14 and the fitting 18 may be coupled to the first conduit 12. Furthermore, in one embodiment, one sealing assembly 100 may be coupled the first conduit 12 and another sealing assembly 100 may be coupled to the second conduit 14. In such embodiment, the assemblies 100 may sealingly engage each other.

A person of ordinary skill in the art should appreciate that the connector 10 may be used in any suitable application and/or in any suitable fluid system. For example, in several embodiments, one or more connectors 10 may be used in a hydraulic system of a work vehicle (not shown), such as agricultural tractor, combine, construction vehicle, and/or the like, or an agricultural implement (not shown), such as a cultivator, harrow, planter, and/or the like.

It should be appreciated that the configuration of the fluid conduit connector 10 described above and shown in FIG. 1 is provided only to place the present subject matter in an exemplary field of use. Thus, it should be appreciated that the present subject matter may be readily adaptable to any manner of fluid conduit connector configuration.

Figure 2:
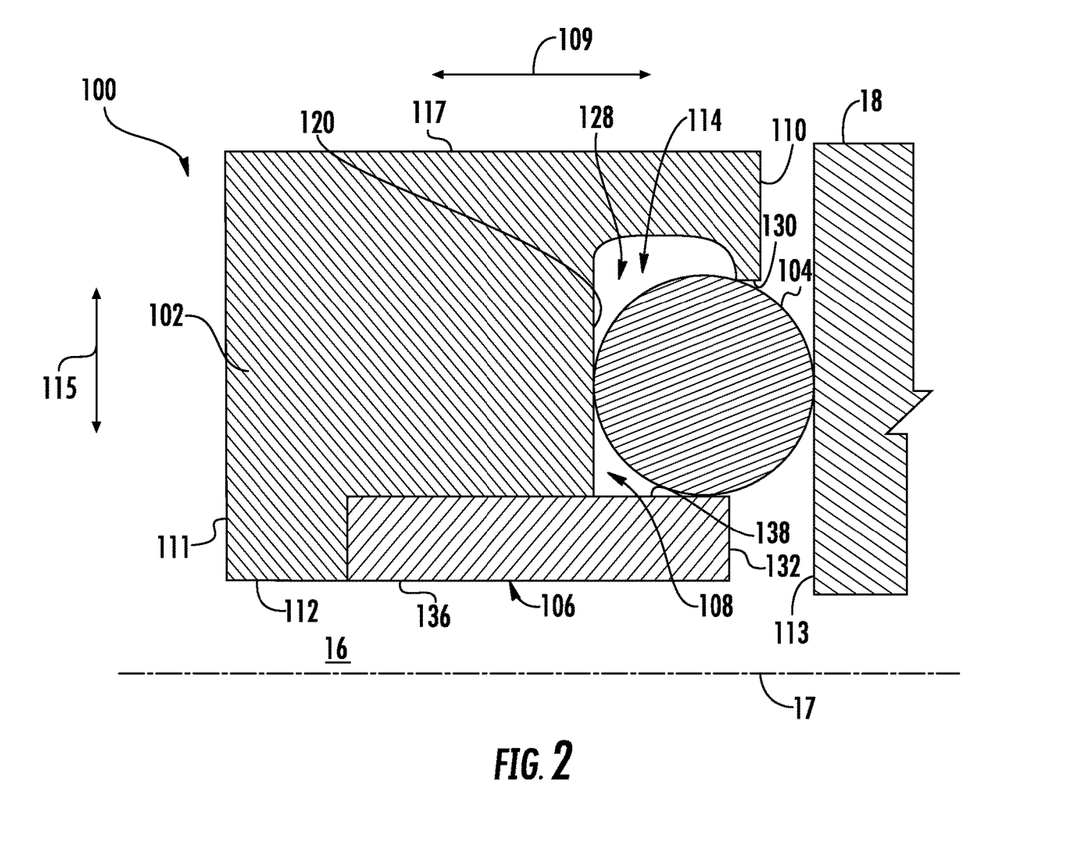
FIG. 2 illustrates a cross-sectional view of one embodiment of a sealing assembly in accordance with aspects of the present subject matter, particularly illustrating a sleeve for retaining a gasket within a groove defined by a connector body.
Figure 3:
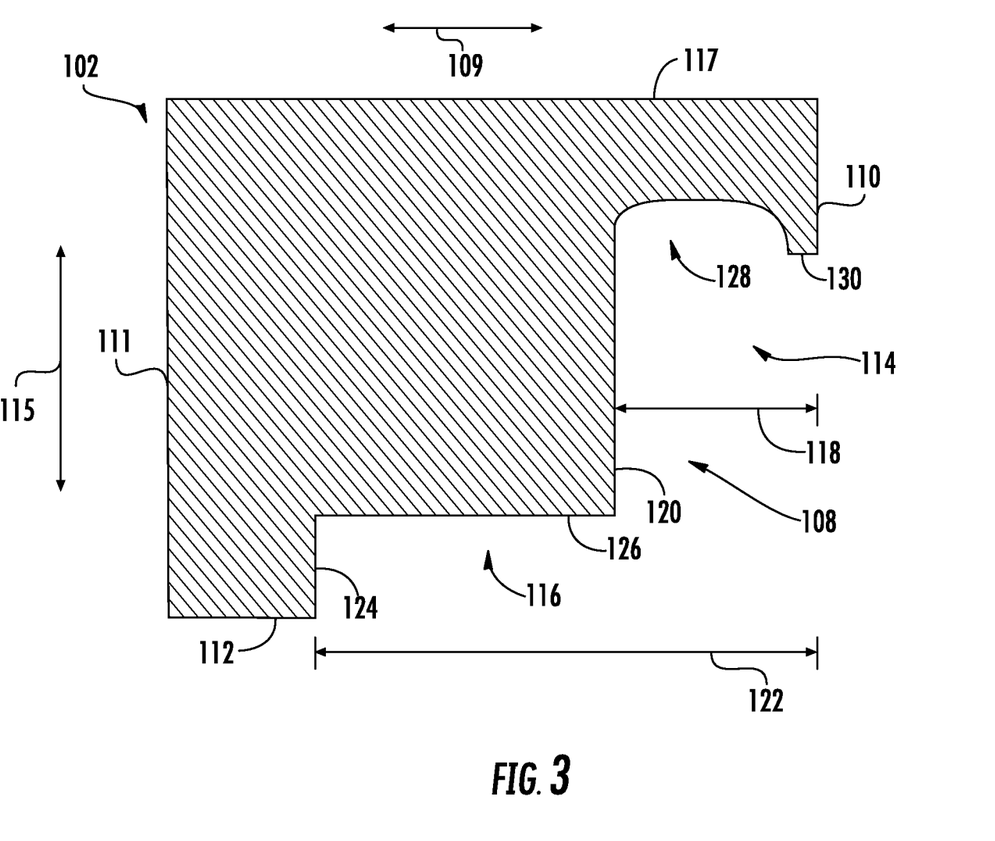
FIG. 3 illustrates a cross-sectional view of the portion of the connector body shown in FIG. 2, particularly illustrating the groove defined by the connector body including a first groove portion and a second groove portion.
Figure 4:
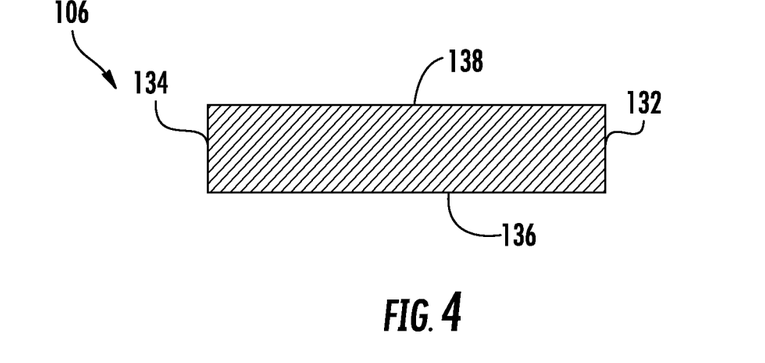
FIG. 4 illustrates a cross-sectional view of the sleeve shown in FIG. 2, particularly illustrating various surfaces of the sleeve.

FIGS. 2-4 illustrate differing cross-sectional views of one embodiment of the sealing assembly 100 for use with a fluid conduit connector in accordance with aspects of the present subject matter. Specifically, FIG. 2 illustrates a cross-sectional view of the sealing assembly 100 including a connector body 102, a gasket 104, and a retention sleeve 106. FIG. 3 illustrates a cross-sectional view the connector body 102, particularly illustrating a groove 108 defined therein for receiving the gasket 104 and the retention sleeve 106. Additionally, FIG. 4 illustrates a cross-sectional view of the retention sleeve 106, particularly illustrating the various surfaces thereof. In general, the sealing assembly 100 will be described herein with reference to the fluid conduit connector 10 described above with reference to FIG. 1. However, it should be appreciated by those of ordinary skill in the art that the disclosed sealing assembly 100 may generally be utilized with connectors having any other suitable connector configuration, including any suitable connectors configured to be coupled between two separate fluid flow components.

Referring to FIGS. 2 and 3, the connector body 102 of the sealing assembly 100 may generally be configured to be coupled to one of the conduits 12, 14 of the fluid connector 10, such as the first conduit 14 as illustrated in FIG. 1. As shown, the connector body 102 may extend along an axial direction (e.g., as indicated by arrow 109 in FIG. 2) between a first axial surface 110 of the connector body 102 and second axial surface 111 of the connector body 102. In general, the axial direction 109 may extend parallel to the axial centerline of the fluid conduit connector 10. For example, in several embodiments, the second axial surface 111 may be coupled to the conduit 12 and the first axial surface 110 may be positioned proximate to a sealing surface 113 of the fitting 18, such as when the sealing assembly 100 is coupled to the fitting 18 by the fastener 20. In this respect, and as will be described below, a portion of the gasket 104 may be positioned between the first axial surface 110 of the connector body 102 and the sealing surface 113 of the fitting 18 so as to seal the fluid passage 16 from leaks. The connector body 102 may also extend along a radial direction (e.g., as indicated by arrow 115 in FIG. 2) between an inner radial surface 112 of the connector body 102 and an outer radial surface 117 of the connector body 102. In several embodiments, the inner radial surface 112 may be positioned on the interior of the connector body 102 so as to define an outer boundary of the fluid passage 16, while the outer radial surface 117 may be positioned on the exterior of the connector body 102 (e.g., at a location adjacent to or facing the fastener 20). However, it should be appreciated that the inner radial surface 112 may be positioned on the exterior of the connector body 102 and the outer radial surface 117 may be positioned on the interior of the connector body 102.

As shown, the connector body 102 may define the groove 108 for receiving the gasket 104 and the retention sleeve 106. Specifically, in several embodiments, the groove 108 may extend axially from the first axial surface 110 of the connector body 102 toward the second axial surface 111 of the connector body 102. Furthermore, in one embodiment, the groove 108 may generally be annular. In such embodiment, the gasket 104 may be configured as an O-ring. As mentioned above, the groove 108 may be wider than or otherwise larger than the gasket 104 that it receives. For example, in one embodiment, the inner diameter of the groove 108 may be smaller than the inner diameter than the gasket 104 such that the retention sleeve 106 may be positioned radially inward of the gasket 104. However, it should be appreciated that, in alternative embodiments, the outer diameter of the groove 108 may be larger than the outer diameter than the gasket 104 such that the retention sleeve 106 may be positioned radially outward of the gasket 104.

As particularly shown in FIG. 3, in several embodiments, the groove 108 may include a first groove portion 114 configured for receiving the gasket 104 and a second groove portion 116 configured for receiving the retention sleeve 106, Specifically, in several embodiments, the first groove portion 114 may be at least partially defined by a first bottom surface 120 of the connector body 102 and a first groove portion side surface 130 of the connector body 102. As such, the first groove portion 114 may define a first depth 118 extending axially from the first axial surface 110 of the connector body 102 to the first bottom surface 120 of the connector body 102. Similarly, in several embodiments, the second groove portion 116 may be at least partially defined by a second bottom surface 124 of the connector body 102 and a second groove portion side surface 126 of the connector body 102. As such, the second groove portion 116 may define a second depth 122 extending axially from the first axial surface 110 of the connector body 102 to the second bottom surface 124 of the connector body 102. As shown, the second bottom surface 124 may be recessed or otherwise axially spaced from the first bottom surface such that the second depth 122 may be greater than the first depth 118 (i.e., the second groove portion 116 may be deeper than the first groove portion 114). In this respect, the second groove portion 116 may form a counter bore-like portion of the groove 108. The first and second bottom surfaces 120, 124 of the of the connector body 102 may generally be parallel with respect to each other. Furthermore, in the embodiment illustrated in FIGS. 2 and 3, the second groove portion 116 may extend radially from inner radial surface 112 of the connector body 102 to the second groove portion side surface 126. Additionally, in one embodiment, the first groove portion 114 may include a dovetail portion 128 extending radially from the first groove portion side surface 130 toward the outer radial surface 117 of the connector body 102.

As indicated above, the gasket 104 may be configured to be positioned within the first groove portion 114. Specifically, as illustrated in FIG. 2, the gasket 104 may be positioned on or otherwise in contact with the first bottom surface 120 of the connector body 102. Furthermore, in several embodiments, a portion of the gasket 104 may be positioned outside of or otherwise external to the groove 108. As such, this portion of the gasket 104 may be configured to contact the sealing surface 113 of the fitting 18. For example, in one embodiment, this portion of the gasket 104 may be configured to sealingly engage the sealing surface 113 of the fitting 18 so as to seal the fluid passage 16 at the location of the fluid conduit connector 10. Additionally, the gasket 104 may be positioned between, such as compressed between, the first groove portion side surface 130 of the connector body 102 and the retention sleeve 106. Although not shown, at least a portion of the gasket 104 may be received within the dovetail portion 128 when the gasket 104 is compressed by the fitting 18.

As shown in the illustrated embodiments, the gasket 104 may be configured as an O-ring seal having a generally circular cross-section. In such embodiments, the gasket 104 may have a torus-like shape. However, a person of ordinary skill in the art should appreciate that the gasket 104 may be configured as any suitable type of gasket or seal having any suitable cross-section and/or shape.

Referring now to FIGS. 2 and 4, and as mentioned above, the retention sleeve 106 may be positioned within the second groove portion 116. In general, the retention sleeve 106 may be configured to retain the gasket 104 within the groove 108. Specifically, as shown in FIG. 4, in several embodiments, the retention sleeve 106 may include an outer surface 132 and an opposing inner surface 134 that may be axially spaced apart from the outer surface 132 of the retention sleeve 106. In one embodiment, the inner surface 134 of the retention sleeve 106 may be in contact with the second bottom surface 124 of the connector body 102. However, in alternative embodiments, the inner surface 134 of the retention sleeve 106 may be axially spaced apart from the second bottom surface 124. As shown in FIG. 2, the outer surface 132 of the retention sleeve 106 may be received relative to the first axial surface 110 of the connector body 102 such that the outer surface 132 of the retention sleeve 106 is positioned axially between first axial surface 110 of the connector body 102 and the first bottom surface 120 of the connector body 102. In alternative embodiments, the outer surface 132 of the retention sleeve 106 is positioned axially between first axial surface 110 of the connector body 102. The retention sleeve 106 may also include a first side surface 136 and an opposing second side surface 138 that may be radially spaced apart from the first side surface 136 of the retention sleeve 106. In one embodiment, the second side surface 138 of the retention sleeve 106 may be in contact with both the second groove portion side surface 126 and the gasket 104. As such, the retention sleeve 106 may exert a force on the gasket 104 so as to compress the gasket 104 between the second side surface 138 of the retention sleeve 106 and the first groove portion side surface 130 of the connector body 102. As shown in FIG. 2, in one embodiment, the first side surface 136 of the retention sleeve 106 may be coplanar (e.g., coplanar within a plus or minus tolerance) with the inner radial surface 112 of the connector body 102. In such embodiment, the first side surface 136 of the retention sleeve 106 may, for example, form a portion of the outer boundary of the fluid passage 16 extending through the connector 10. Furthermore, the retention sleeve 106 may be fixedly coupled (e.g., via welding, brazing, pressing, staking, bonding, etc.) to the connector body 102 so as to prevent the gasket 104 and the retention sleeve 106 from dislodging from the groove 108. Although the embodiment shown in FIGS. 2 and 4 illustrates the retention sleeve 106 as having a rectangular cross-section, the retention sleeve 106 may have any suitable cross-section.

Figure 5:
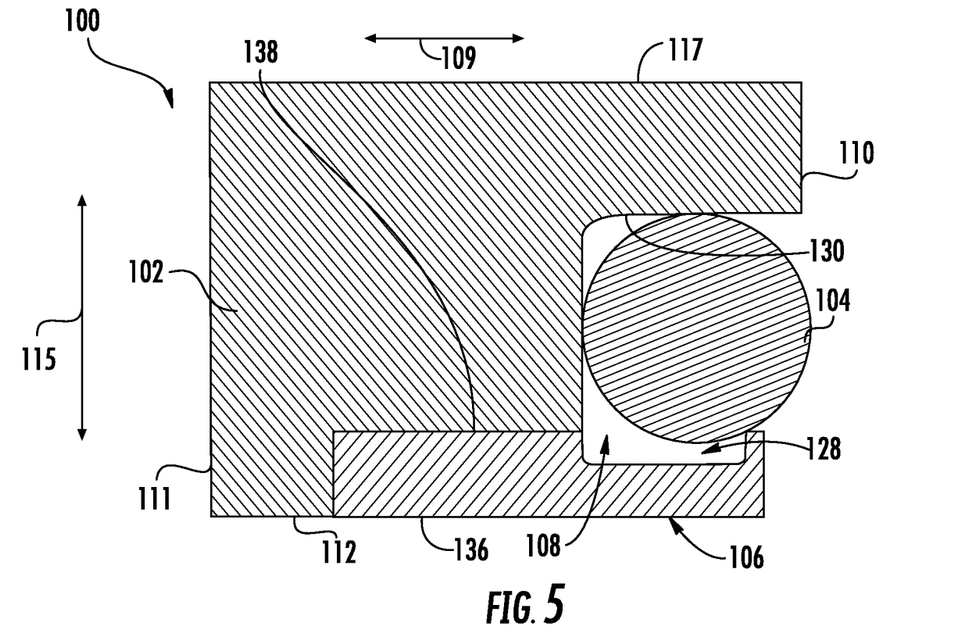
FIG. 5 illustrates a cross-sectional view of another embodiment of a sealing assembly in accordance with aspects of the present subject matter, particularly illustrating a sleeve defining a dovetail for retaining an O-ring within a groove defined by a connector body.

FIG. 5 illustrates a cross-sectional view of another embodiment of the disclosed sealing assembly 100. As shown, unlike the embodiment described above, the dovetail portion 128 may be defined by the retention sleeve 106. For example, the dovetail portion 128 may extend radially from the second side surface 138 of the retention sleeve 106 toward the first side surface 136 of the retention sleeve 106. In such embodiment, the first groove portion side surface 130 may not include the dovetail portion 128 as shown in FIGS. 2 and 3. Although not shown, at least a portion of the gasket 104 may be received within the dovetail portion 128 of the retention sleeve 106 when the gasket 104 is compressed by the fitting 18. Furthermore, in alternative embodiments, the sealing assembly 100 may not include any dovetail portions 128.

Figure 6:
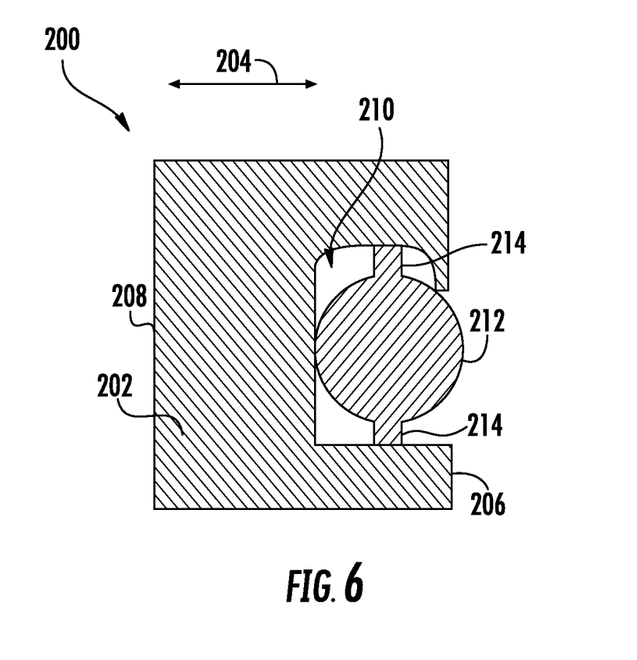
FIG. 6 illustrates a cross-sectional view of one embodiment of a gasket in accordance with aspects of the present subject matter, particularly illustrating the gasket including a flash projection for filling a groove defined by a connector body to reduce movement of the gasket within the groove.

Referring now to FIG. 6, a cross-sectional view of a further embodiment of a sealing assembly 200 is illustrated in accordance with aspects of the present subject matter. In general, the sealing assembly 200 will be described herein with reference to the fluid conduit connector 10 described above with reference to FIG. 1. However, it should be appreciated by those of ordinary skill in the art that the disclosed sealing assembly 200 may generally be utilized with connectors having any other suitable connector configuration.

As shown, the sealing assembly 200 may include a connector body 202 extending in an axial direction (e.g., as indicated by arrow 204 in FIG. 6) between an outer surface 206 and an inner surface 208. The connector body 202 may define a groove 210 for receiving a gasket 212, such as the illustrated O-ring seal. In general, the groove 210 may extend axially from the outer surface 206 of the connector body 202 toward the inner surface 208 of the connector body 202. In several embodiments, the gasket 212 may include one or more projections 214 that are configured to at least partially fill or otherwise occupy a portion of the groove 210. As such, the positioning of the projections 214 may prevent the gasket 212 from becoming dislodged from the groove 210 or misaligned within an adjacent component of the connector 10, such as the fitting 18. For example, in one embodiment, the projection 214 may correspond to flash from molding the gasket 206.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing assembly, comprising:
  a connector body extending between a first axial surface and a second axial surface spaced apart from the first axial surface along an axial direction, the connector body defining a groove extending axially from the first axial surface toward the second axial surface, the groove including a first groove portion and a second groove portion, the first groove portion being at least partially defined by a first intermediate surface of the connector body, the first groove portion defining a first depth extending axially from the first axial surface of the connector body to the first intermediate surface of the connector body, the second groove portion being at least partially defined by a second intermediate surface of the connector body, the second groove portion defining a second depth extending axially from the first axial surface of the connector body to the second intermediate surface of the connector body, the second depth being greater than the first depth;
  a gasket positioned in the first groove portion; and
  a retention sleeve positioned in the second groove portion, the retention sleeve being configured to retain the gasket within the first groove portion,
  wherein the gasket comprises an O-ring seal having a circular cross-section in a plane extending parallel to the axial direction, and
  wherein the first groove portion is at least partially defined by a first groove portion side surface of the connector body and a dovetail portion extending radially from the first groove portion side surface, the retention sleeve comprising an outer side surface extending axially between first and second axial ends of the retention sleeve, the outer side surface of the retention sleeve being in contact with the gasket, a distance between the dovetail portion of the connector body and the outer side surface of the retention sleeve being greater than a diameter of the circular cross-section of the O-ring seal.

2. The sealing assembly of claim 1, wherein the retention sleeve is configured to push the gasket into the dovetail portion defined by the connector body.

3. The sealing assembly of claim 2, wherein the connector body extends radially between a first side surface and second side surface, the second groove portion extending radially from the first side surface of the connector body toward the second side surface of the connector body, the dovetail portion extending radially from the first groove portion side surface towards the second side surface of the connector body, the first groove portion side surface being in contact with the gasket.

4. The sealing assembly of claim 3, wherein the first groove portion side surface extends axially from the first axial surface along a portion of the first depth.

5. The sealing assembly of claim 1, wherein a portion of the gasket is positioned outside of the groove, the portion of the gasket being configured for contact with a sealing surface of an adjacent component.

6. The sealing assembly of claim 1, wherein the second axial end of the retention sleeve is in contact with the second intermediate surface of the connector body.

7. The sealing assembly of claim 6, wherein the first axial end of the retention sleeve is positioned axially between the first axial surface of the connector body and the first intermediate surface of the connector body.

8. The sealing assembly of claim 6, wherein the connector body extends radially between a first side surface and second side surface, the first side surface and the second side surface extending between the first and second axial surfaces of the connector body, the first side surface extending parallel to the axial direction, the second groove portion extending radially from the first side surface of the connector body toward the second side surface of the connector body.

9. The sealing assembly of claim 8, wherein the retention sleeve comprises an inner side surface extending axially between the first and second axial ends of the retention sleeve and parallel to the axial direction, the first side surface of the connector body and the inner side surface of the retention sleeve being coplanar.

10. The sealing assembly of claim 1, wherein a contour of the gasket and a contour of the dovetail portion of the connector body are incongruent such that a gap is formed between the dovetail portion of the connector body and a portion of the gasket.

11. The sealing assembly of claim 1, wherein a contour of the gasket and a contour of the outer side surface of the retention sleeve are incongruent such that a gap is formed between the outer side surface of the retention sleeve and a portion of the gasket.

12. The sealing assembly of claim 11, wherein the outer side surface of the retention sleeve extends parallel to the axial direction.

13. A fluid connector for coupling a first fluid flow component to a second fluid flow component to provide a continuous fluid passageway between the first and second fluid flow components, the fluid connector comprising:
a fitting coupled to one of the first fluid flow component or the second fluid component;
a sealing assembly coupled to the other of the first fluid flow component or the second fluid flow component, the sealing assembly configured to seal against the fitting to seal the fluid passageway, the sealing assembly comprising:
a connector body extending between a first axial surface and a second axial surface spaced apart along an axial direction, the connector body defining a groove extending axially from the first axial surface toward the second axial surface, the groove including a first groove portion and a second groove portion, the first groove portion being at least partially defined by a first intermediate surface of the connector body, the first groove portion defining a first depth extending axially from the first axial surface of the connector body to the first intermediate surface of the connector body, the second groove portion being at least partially defined by a second intermediate surface of the connector body, the second groove portion defining a second depth extending axially from the first axial surface of the connector body to the second intermediate surface of the connector body, the second depth being greater than the first depth;
a gasket positioned in the first groove portion; and
a retention sleeve positioned in the second groove portion, the retention sleeve being configured to retain the gasket within the first groove portion,
wherein the gasket comprises an O-ring seal having a circular cross-section in a plane extending parallel to the axial direction, and
wherein the first groove portion is at least partially defined by a first groove portion side surface of the connector body and a dovetail portion extending radially from the first groove portion side surface, the retention sleeve comprising an outer side surface extending axially between first and second axial ends of the retention sleeve, the outer side surface of the retention sleeve being in contact with the gasket, a distance between the dovetail portion of the connector body and the outer side surface of the retention sleeve being greater than a diameter of the circular cross-section of the O-ring seal.

14. The fluid connector of claim 13, wherein the retention sleeve is configured to push the gasket into the dovetail portion defined by the connector body.

15. The fluid connector of claim 13, herein a portion of the gasket is positioned outside of the groove, the portion of the gasket being configured for contact with a sealing surface of the fitting.

16. The fluid connector of claim 13, wherein the connector body extends radially between a first side surface and second side surface, the first side surface and the second side surface extending between the first and second axial surfaces of the connector body, the first side surface of the connector body extending parallel to the axial direction, the second groove portion extending radially from the first side surface of the connector body toward the second side surface of the connector body.

17. The fluid connector of claim 16, wherein the retention sleeve comprises an inner side surface extending between the first and second axial ends of the retention sleeve and parallel to the axial direction, the first side surface of the connector body and the inner side surface of the retention sleeve being coplanar.

18. A sealing assembly, comprising:
a connector body extending between a first axial surface and a second axial surface spaced apart from the first axial surface along an axial direction, the connector body defining a groove extending axially from the first axial surface toward the second axial surface, the groove including a first groove portion and a second groove portion, the first groove portion being at least partially defined by a first intermediate surface of the connector body, the first groove portion defining a first depth extending axially from the first axial surface of the connector body to the first intermediate surface of the connector body, the second groove portion being at least partially defined by a second intermediate surface of the connector body, the second groove portion defining a second depth extending axially from the first axial surface of the connector body to the second intermediate surface of the connector body, the second depth being greater than the first depth;
a gasket positioned in the first groove portion; and
a retention sleeve positioned in the second groove portion, the retention sleeve being configured to retain the gasket within the first groove portion,
wherein the gasket comprises an O-ring seal having a circular cross-section in a plane extending parallel to the axial direction, and wherein the first groove portion is at least partially defined by a first groove portion side surface of the connector body, the retention sleeve comprising an outer side surface extending axially between first and second axial ends of the retention sleeve and a dovetail portion spaced radially inwardly from the outer side surface, the outer side surface of the retention sleeve being in contact with the gasket, a distance between the dovetail portion of the retention sleeve and the first groove portion side surface of the connector body being greater than a diameter of the circular cross-section of the O-ring seal.

19. The sealing assembly of claim 18, wherein the retention sleeve comprises an inner side surface extending between the first and second axial ends of the retention sleeve, the dovetail portion being spaced radially inwardly from the outer side surface of the retention sleeve towards the inner side surface of the retention sleeve.

* * * * *